J. B. STORY.
MOTOR PLOW TRACTOR.
APPLICATION FILED MAR. 31, 1916. RENEWED MAY 26, 1917.
1,247,170.
Patented Nov. 20, 1917.
3 SHEETS—SHEET 3.
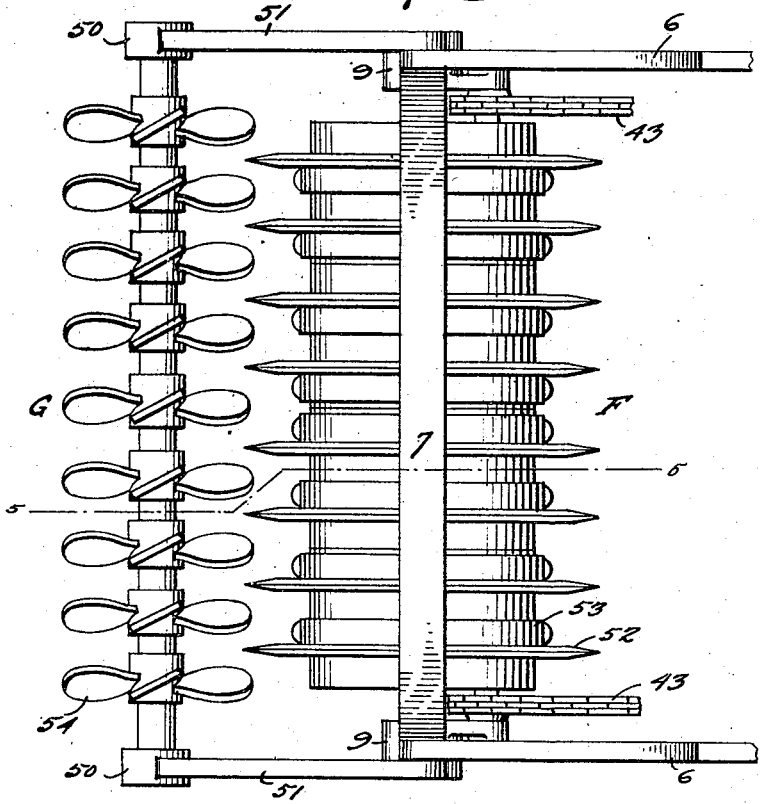
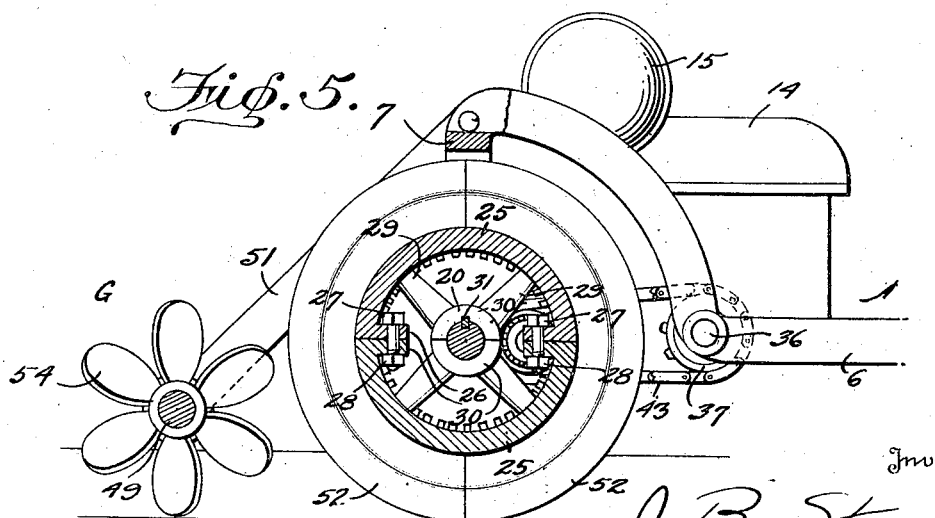

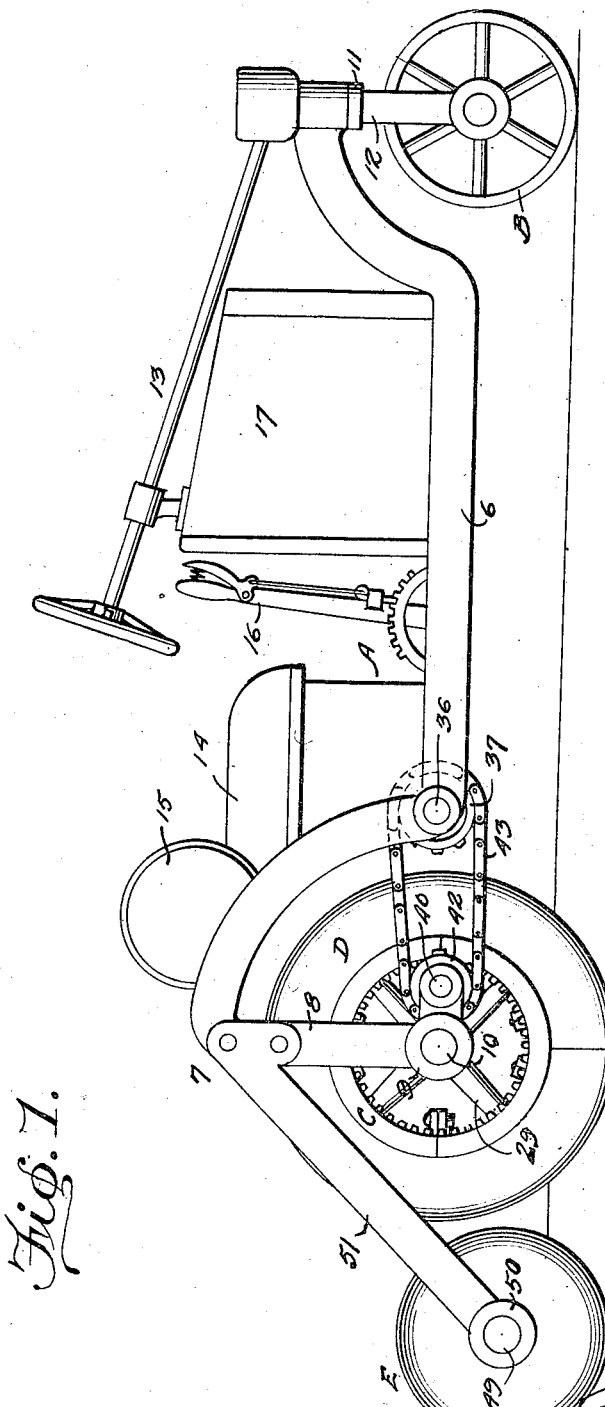

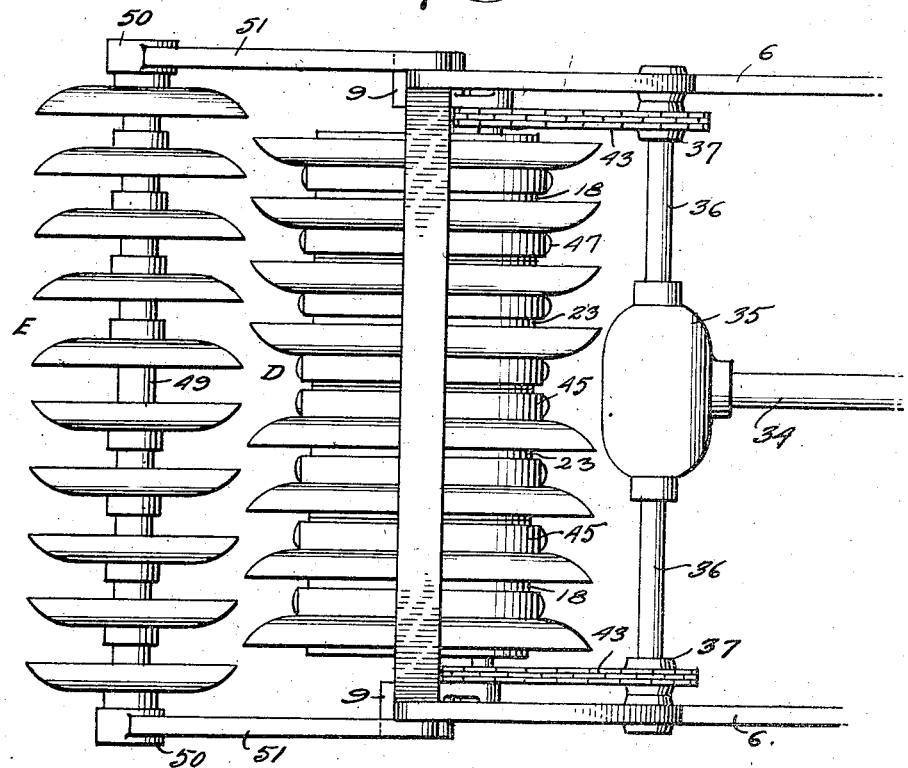
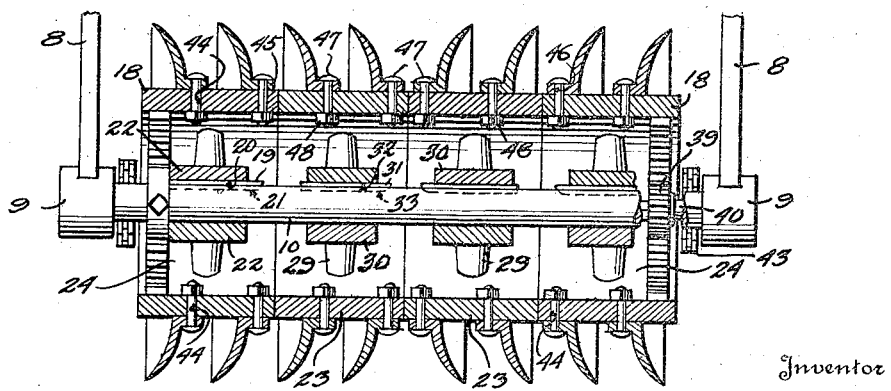

UNITED STATES PATENT OFFICE.

JOHN BROOKS STORY, OF FOREST, MISSISSIPPI.

MOTOR-PLOW TRACTOR.

1,247,170.   Specification of Letters Patent.   Patented Nov. 20, 1917.

Application filed March 31, 1916, Serial No. 88,053. Renewed May 26, 1917. Serial No. 171,306.

*To all whom it may concern:*

Be it known that I, JOHN B. STORY, a citizen of the United States, residing at Forest, in the county of Scott and State of Mississippi, have invented a new and useful Improvement in Motor-Plow Tractors, of which the following is a specification.

My present invention relates to motor plows and tractors, so constructed that the entire weight of the end portion of the tractor is brought upon the soil-working implements.

It has been proposed to work the soil by use of tractors, drawing the soil working implements, such as plows or harrows, either to the rear of, or beneath the tractor, and such has been brought into practical use, however, close attention to the soil-working implements is necessary, and since their penetration into the soil is dependent upon the weight of the implement alone, plowing or harrowing is not uniform where the soil is of different degrees of density and furthermore, two or more operators are necessary to carry out the object in view,— one to guide the tractor and others to direct the soil-working operation and to rectify insufficient penetration due to slipping or upward movement of the plows.

The principal objects of my invention are first, to provide a tractor embodying soil-working implements, the horizontal axes of which are fixed with respect to the tractor so that the weight of the machine comes upon such implements, assuring uniform penetration; second, to provide a machine of the character described which can be effectively used in the working of soil, requiring the attention of but one operator; third, to provide a tractor which may be adapted for use as a tractor *per se*, a land roller, a plow, or a combined plow and harrow; fourth, to provide a machine of the character described which is inexpensive to manufacture and maintain in good repair; and fifth, to provide a machine which may be used for various purposes, but which is compact.

Other objects of the invention will appear in the following detailed description, taken in connection with the accompanying drawings forming a part of this specification, and in which drawings:

Figure 1 is a side elevation of a motor plow and tractor constructed according to my invention.

Fig. 2 is a plan view of the rear portion of the machine, the operator's seat having been removed to disclose details.

Fig. 3 is a longitudinal vertical sectional view through the rear portion of the tractor as shown in Fig. 1.

Fig. 4 is a view similar to Fig. 2 showing different types of soil-working implements arranged in operative relation to the tractor.

Fig. 5 is a sectional view on the line 5—5 of Fig. 4.

In the drawings, where similar characters refer to similar parts throughout the several views, A designates a tractor body; B a steering wheel; C ground rollers to which power is applied; D disk plows carried by rollers C; E supplemental disk plows; F soil cutters; and G, soil pulverizers.

The tractor body is preferably made of rolled steel sections, and comprises longitudinal members 6, supported at the rear ends by yoke 7, the stems 8 of which are formed with journals 9, receiving power shaft 10, while the forward portions of longitudinal members 6 are supported upon a bearing 11 formed on the fork 12 of steering wheel B. Any suitable steering mechanism 13 may be provided for rotating fork 12 about its vertical axis, and as shown, an operator's seat 14, fuel tanks 15, motive power control lever 16 and hood 17 for the engine may be mounted upon the tractor body.

While I have herein shown a tractor embodying a single steering wheel, it is to be understood that I am not limited to this particular type of tractor, neither is it necessary that the tractor be operated with the steering wheel foremost.

Referring now to the ground roller C, it preferably comprises traction wheels or roller sections 18, secured to power shaft 10 in any suitable manner, such as by keys 19 fitting in complemental grooves 20 and 21 in hub 22 of each wheel 18 and its power shaft 10, respectively; and, supplemental roller sections 23, a plurality of which are disposed intermediate, and filling the space between wheels 18. These roller sections 23 are of the same diameter as traction wheels 18, and when positioned intermediate the two form a substantially uniform surface, resembling a roller such as is used in the making of roads, or in leveling the soil.

In practice, the wheels 18 and roller sections 23 are of such a diameter that access may be gained to the interior thereof through the open ends 24.

Each roller section is preferably made up of a plurality of segments 25, such as two complemental halves, as clearly shown in Fig. 5, said segments being joined in any suitable manner, such as by being provided with inturned flanges 26, joined by bolts 27 and nuts 28. Each segment carries a plurality of spokes 29 to which are secured hub segments 30. In order that movement of power shaft 10 may be imparted to the roller sections 23, a key 31 is provided for each of said sections, entering grooves 32 and 33 in one hub section and shaft 10, respectively.

Should it be desired to use the machine as a tractor *per se*, it may be moved until one dividing line between each segment 25 of roller section 23 is lowermost. Then, by releasing nuts 28 and removing the bolts 27, segments 25 fall away from power shaft 10, and the tractor body A is supported wholly by traction wheels 18.

Motion from transmission 34, which embodies a differential 35, counter shafts 36, to which are secured sprocket wheel 37 may be imparted to traction wheels 18 through gear teeth 38 formed on the interior of said wheels, and with which mesh pinions 39, mounted on shafts 40, which have bearing in a projection 41 of stems 8. Shaft 40 is rotated through sprocket wheel 42, about which, in addition to sprocket wheel 37 is trained a chain 43.

Inasmuch as the roller sections are to carry soil working implements, such as the disk plows D, these roller sections are provided with a plurality of perforations 44 extending radially through the rims of the rollers, and the disk plows are provided with circumferentially extending flanges 45 having perforations 46 adapted to aline with the perforations in the roller rim. Through the alined perforations are passed bolts 47, receiving nuts 48 at the interior of the rollers. It is preferred to form each disk plow of two complemental halves or, in other words, to make it up of segmental sections so that the plows may be readily detached from the roller when their use is not desired. As clearly shown in Fig. 2, the concave sides of the disks face the sides of the machine, an equal number of disks being affixed to the roller at both sides of the longitudinal axis of the machine, to prevent side draft.

The supplemental disk plows E are so arranged as to act upon the soil cakes turned by the plows D as to thoroughly open up the furrows. These plows are mounted upon a shaft 49, journaled in the bearings 50 of brackets 51, made rigid with the tractor body A, as clearly shown in Fig. 1 of the drawing.

If desired, soil cutters F may be mounted on the roller. These soil cutters may be made of segments 52, provided with flanges 53, by which they are secured to the roller sections in any suitable manner, such as is shown for the connection of disk plows with said rollers. When soil cutters are utilized on the roller sections, the soil pulverizers G are mounted on shafts 49, the blades 54 of the pulverizers working between the furrow cutters F, so that the soil cake adhering to said cutters is broken up, in addition to being acted upon after the rollers have passed over the soil.

While I have hereinbefore specifically described implements, such as disk plows, soil cutters and pulverizers as being carried by the tractor and the penetration of which into the furrow, is gaged by roller sections, it is to be understood that I do not wish myself limited to the application of these specific devices except in so far as the claims import.

From the foregoing it is made manifest that, by the removal of roller sections 23, supporting the tractor body wholly by traction wheels 18, the machine may be used for the moving of heavy objects, such as threshing machines, or, in other words, as a tractor *per se*. By affixing the roller sections 23 to the drive shaft 10 the machine may be used as a roller for making roads, leveling ground or compressing turf. When applying soil-working implements to either the roller sections or the shafts 49, they may be positioned to uniformly work the soil, or some of the implements may be dispensed with where it is desirable to open furrows for the purpose of planting seed in furrows remote one from another. Since the weight of one end portion of the tractor comes upon the soil-working implements, they are caused to penetrate the soil and uniformity is accomplished by the engagement of the roller with the soil surface, to limit penetration. The disks, cutters or pulverizers may be of any suitable diameter, it being understood that their projection below the plane common to roller sections 23 and the steering wheel B determines the depth of the cut or furrow made in the soil.

Changes in details may be made without departing from the spirit and scope of my invention; but,

I claim:

1. In a motor plow, a roller, and a plurality of disk plows detachably secured to said roller.

2. In a motor plow, a roller comprising a plurality of separately detachable roller sections, and a disk plow secured to each roller section.

3. In a motor plow, a roller comprising a plurality of separately detachable roller sections and a disk plow detachably secured to each roller section.

4. In a motor plow, the combination of a plurality of separately detachable rollers each comprising a plurality of sections, and a soil-working implement secured to each of said rollers.

5. In a motor plow, a plurality of separately detachable rollers each comprising a plurality of sections, and a soil-working implement detachably secured to each of said rollers.

6. A motor plow and tractor comprising in combination, a tractor body, a roller including a plurality of detachable sections divided longitudinally supporting said body and provided with a plurality of perforations, a plurality of soil-working implements to fit about said roller, each implement being divided into sections and provided with arcuate flanges having perforations to aline with those in said roller, the sections of said roller breaking joints with the sections of said soil-working implements, and securing devices passing through said alined perforations.

7. In a tractor, the combination of a drive shaft, traction wheels on said drive shaft in spaced relation, a plurality of segmental sections of a radius equal to that of said traction wheels and forming rollers, disposed intermediate and filling the space between said traction wheels, and means for securing said sections together and rigid with said drive shaft.

8. In a tractor, the combination of a drive shaft, traction wheels on said drive shaft in spaced relation, a plurality of rollers on said shaft, each roller of the same diameter as said traction wheels, filling the space therebetween, said rollers each being formed in two complemental sections, a key for retaining said rollers rigid with said drive shaft, with their dividing lines in alinement, and means for securing the sections of each roller together.

JOHN BROOKS STORY.

Copies of this patent may be obtained for five cents each, by addressing the "Commissioner of Patents, Washington, D. C."